Dec. 5, 1967 K. C. WEHR 3,356,991

PLURAL REGISTERS HAVING COMMON GATING FOR DATA TRANSFER

Filed Feb. 28, 1964 2 Sheets-Sheet 1

Karl C. Wehr,
*INVENTOR.*

BY Harry M. Saragovitz
Edward J. Kelly
Herbert Berl
Robert C. Sims

Karl C. Wehr,
INVENTOR.

BY Harry M. Saragovitz
Edward J. Kelly
Herbert Berl
Robert C. Sims

United States Patent Office 3,356,991

Patented Dec. 5, 1967

3,356,991

PLURAL REGISTERS HAVING COMMON GATING FOR DATA TRANSFER

Karl C. Wehr, Ellicott City, Md., assignor, by mesne assignments, to the United States of America as represented by the Secretary of the Army Filed Feb. 28, 1964, Ser. No. 348,922
1 Claim. (Cl. 340—147)

This invention relates generally to a system for moving information from one register to another. More particularly this invention relates to a system which permits all registers to be gated to a common gating circuitry which in turn is connected to inputs of all registers.

It is a requirement of data processing or computing systems in missile work to be capable of moving information from one register to another within the system. This is usually accomplished by providing special gating circuitry on either the input or the output of a given register. This method has the disadvantage of requiring gating circuitry and a drive capability (AND gates, OR gates and emitter follower hardware) per register-bit that is directly proportional to the number of different registers to which a given register must communicate. This method also requires, during the system test phase of a project, long tedious testing procedures to insure that all registers and gating paths are operating properly.

Accordingly, it is an object of the present invention to provide a system for moving information from one register to another suitable for use in a data processing or a computing system for missile work.

A further object of the present invention is to provide a reduction in the number of component parts while performing the same functions of more complex systems.

These and other objects and advantages of the present invention will become apparent from the following detailed description and from the accompanying drawings, in which.

Figure 1:
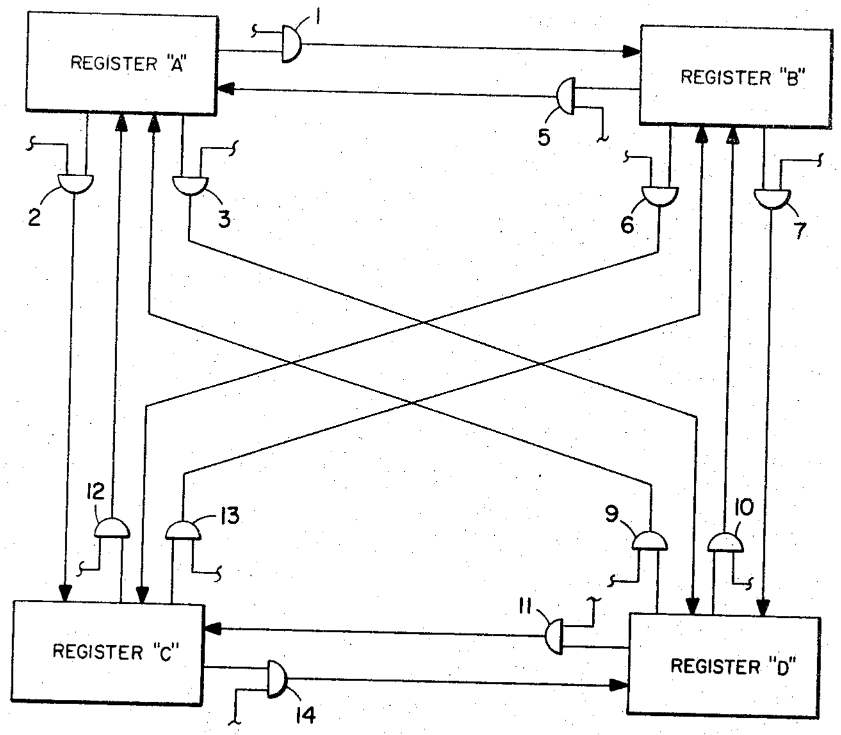
FIG. 1 (PRIOR ART)
FIGURE 1 is a schematic circuit diagram according to the prior art.

In order to be able to move information from one register to another, prior art systems used a separate gating circuitry on an output of a given register to gate it to an input of every other register with which it must communicate. Such a system is shown in FIGURE 1. Register "A" must communicate with registers "B," "C" and "D." In order for register "A" to do this, AND gates 1, 2, and 3 are provided for connecting an output of register "A" to inputs of registers "B," "C" and "D." AND gates 5, 6, and 7 are provided for register "B" to communicate to each of the other registers. Likewise AND gates 9–14 are provided for registers "C" and "D." The other input for the AND gates is connected to circuitry, not shown, for determining which register will communicate with another. For example, if register "A" is to communicate with register "C," then a signal is sent by the circuitry, not shown, to the unconnected end of AND gate 2; therefore providing an input to register "C" which is equal to the output of register "A." Since no signal is supplied to the AND gates 6 and 11, the output of these gates will be zero; therefore not affecting the communication between register "A" and register "B."

This method has the disadvantage of requiring gating circuitry and a drive capability per register-bit that is directly proportional to the number of different registers to which a given register must communicate.

Figure 2:
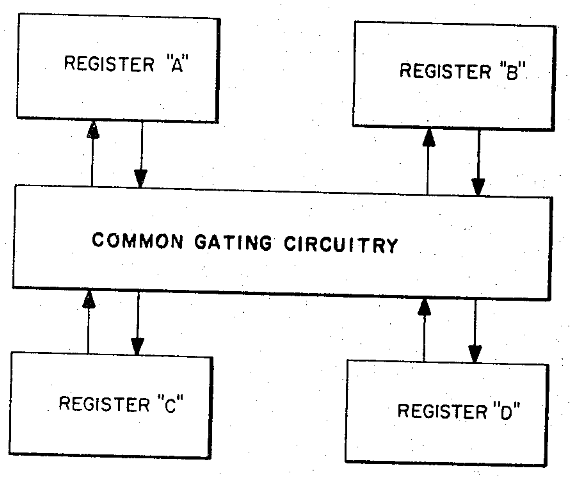
FIGURE 2 is a block diagram illustration according to the invention.

The present invention, shown in FIGURE 2, permits all registers to be gated to a common gating circuitry which in turn is gated back to the inputs of each register. This arrangement allows the contents of any register to be gated (or moved) to any other register. It also provides for gating the contents of a given register back to the same register. This feature is useful during the system test and debugging phase of a project.

Figure 3:
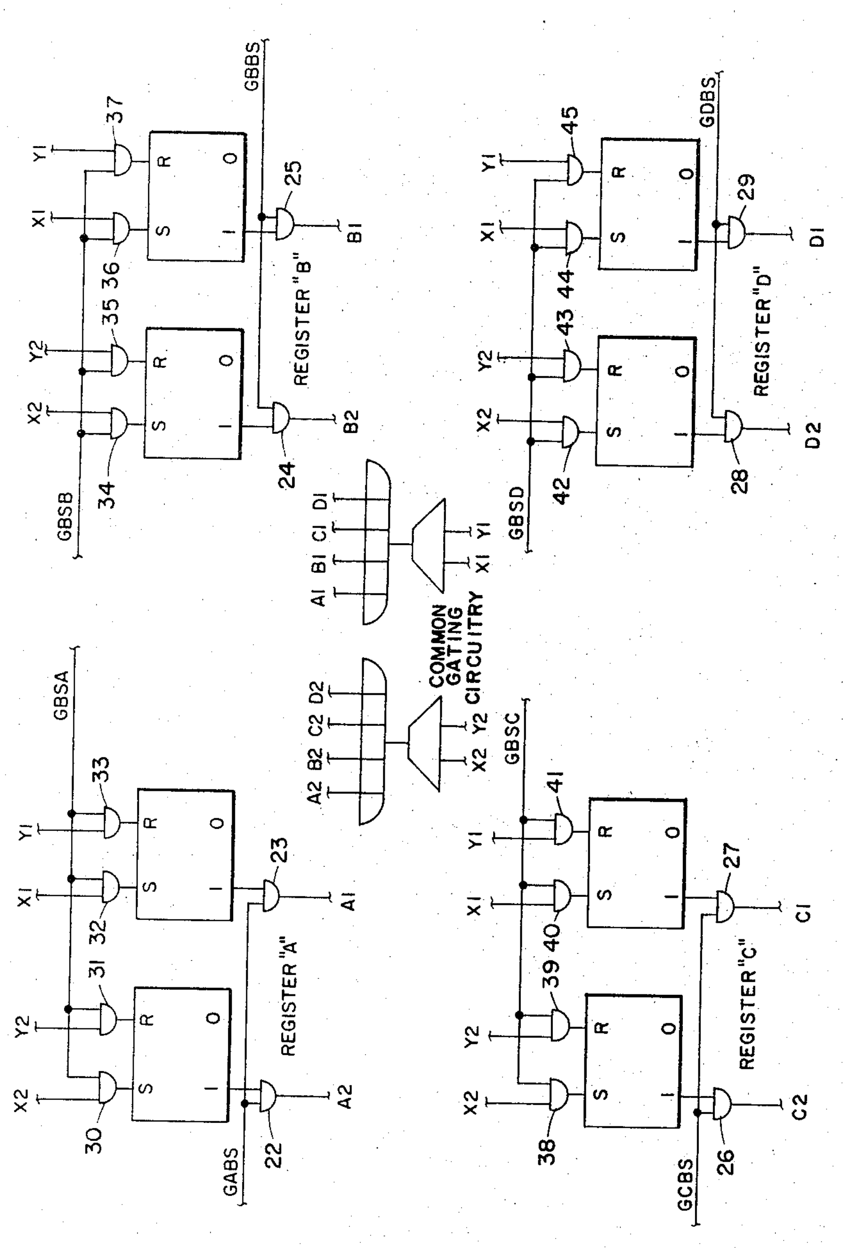
FIGURE 3 is a schematic circuit diagram of a preferred embodiment of the invention.

A detailed logic diagram of 4–2 bit registers and a 2 bit gate is shown in FIGURE 3. In this figure, it is assumed that capability be provided to gate the contents of the "A" register to the A, B, C and D registers; that the contents of the "B" register be gated to the A, B, C and D registers, etc. The following control lead abbreviations are used in FIG. 3:

GBSA—Gate the common gate to the A register;
GBSB—Gate the common gate to the B register;
GBSC—Gate the common gate to the C register;
GBSD—Gate the common gate to the D register;
GABS—Gate the A register to the common gate;
GBBS—Gate the B register to the common gate;
GCBS—Gate the C register to the common gate; and
GDBS—Gate the D register to the common gate.

The common gating circuitry has outputs which are designated X2, X1, Y2 and Y1. The outputs of the bits of the various registers are designated A2, A1, B2, B1, C2, C1, D2 and D1. The output A2 of register "A" is connected to the input A2 of the common gating circuitry, the output B2 of register "B" is connected to the input B2 of the common gating circuitry, the output C2 of register "C" is connected to input C2 of the common gating circuitry, etc. The outputs X2, X1, Y2 and Y1 of the common gating circuitry are connected to the respective inputs X2, X1, Y2 and Y1 of the registers A, B, C and D.

The common gating circuitry is one that will provide a "one" output on its "X" side and a "zero" on its "Y" side whenever there is a "one" on any of its inputs A, B, C, or D. When the inputs to the common gating circuit are all "zero," then the common gating circuit will provide a "zero" output of its "X" side and a "one" on its "Y" side. This is shown in FIGURE 3 as a conventional OR gate having its output connected to a conventional monostable circuit such as a monostable multivibrator.

The operation of FIGURE 3 is performed by selecting the proper circuit to enable the proper AND gates. For example, if it was required to move the information from register "A" to register "B," then a "one" signal would be placed on GABS circuit and the GBSB circuit. This will cause output X2 of the common gating circuit to be equal to A2, output Y2 to be equal to $\overline{A2}$ (not A2), output X1 to be equal to A1, output Y1 to be equal to $\overline{A1}$ (not A1). Since the AND gates 24–29 will all have a "zero" on one of the inputs of said gates, the output of each of these gates will be "zero." The same is true of AND gates 30–33 and 38–45. However AND gates 34–37 will have an output equal to "X" or "Y" as the GBSB circuit has a "one" signal on it. Since the outputs of AND gates 34–37 are fed to set (S) and reset (R) terminals of the register "B," the information of register "A" is transferred thereto.

While the invention has been described with reference to a preferred embodiment thereof, it will be apparent that various modifications and other embodiments thereof will occur to those skilled in the art within the scope of the invention. Accordingly, I desire the scope of my invention to be limited only by the appended claim.

I claim:

A gating circuit for moving information from one register to another comprising in combination a plurality of registers, which are more than two in number, each having an input circuit and an output circuit; a common gating circuit having an input circuit and an output circuit; a plurality of first AND gates each having a first input and an output separately connecting the output circuit of each register to the input circuit of said common gating circuitry a plurality of second AND gates each having a first input and an output separately connecting the input circuit of each register to the output circuit of the common gating circuitry; and separate means connected to a second input of each of the AND gates whereby information may be moved from any one register to another.

References Cited

UNITED STATES PATENTS

| | | | |
|---|---|---|---|
| 2,951,125 | 8/1960 | Andrews | 340—147 |
| 3,063,036 | 11/1962 | Reach et al. | 340—172.5 |
| 3,184,552 | 5/1965 | Macrander | 340—147 |
| 3,228,005 | 1/1966 | Delmege, et al. | 340—172.5 |

THOMAS B. HABECKER, *Acting Primary Examiner.*

NEIL C. READ, *Examiner.*

H. I. PITTS, *Assistant Examiner.*